United States Patent
Bavaria et al.

(10) Patent No.: US 8,261,050 B2
(45) Date of Patent: Sep. 4, 2012

(54) VITAL PRODUCT DATA COLLECTION DURING PRE-STANDBY AND SYSTEM INITIAL PROGRAM LOAD

(75) Inventors: Priti Bavaria, Austin, TX (US); Douglas M. Boecker, Rochester, MN (US); Diane L. Knipfer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 12/116,987

(22) Filed: May 8, 2008

(65) Prior Publication Data

US 2009/0282416 A1    Nov. 12, 2009

(51) Int. Cl.
*G06F 9/445* (2006.01)
(52) U.S. Cl. .............. 713/1; 713/2; 713/100; 717/130
(58) Field of Classification Search .......... 713/1, 2, 713/100; 717/130
See application file for complete search history.

(56) References Cited

U.S. PATENT DOCUMENTS

| | | | |
|---|---|---|---|
| 6,434,697 B1* | 8/2002 | Leyda et al. | 713/2 |
| 6,721,881 B1* | 4/2004 | Bian et al. | 713/1 |
| 6,732,264 B1* | 5/2004 | Sun et al. | 713/2 |
| 6,883,091 B2* | 4/2005 | Morrison et al. | 713/2 |
| 7,152,123 B2 | 12/2006 | Meyer et al. | |
| 7,222,313 B2 | 5/2007 | Bullis et al. | |
| 7,984,282 B2* | 7/2011 | George et al. | 713/1 |
| 2002/0184483 A1* | 12/2002 | Morrison et al. | 713/2 |
| 2003/0028766 A1* | 2/2003 | Gass et al. | 713/164 |
| 2004/0181658 A1* | 9/2004 | Haswarey et al. | 713/1 |
| 2005/0102488 A1 | 5/2005 | Bullis | |
| 2006/0156294 A1 | 7/2006 | Fuller, III et al. | |
| 2006/0168182 A1 | 7/2006 | Fuller, III et al. | |
| 2007/0005947 A1* | 1/2007 | Chartrand et al. | 713/1 |

* cited by examiner

*Primary Examiner* — Li Zhen
*Assistant Examiner* — Viva Miller
(74) *Attorney, Agent, or Firm* — Yee & Associates, P.C.; David A. Mims, Jr.

(57) ABSTRACT

Selectively recollecting vital product data during an initial program load at data processing system power on is provided. In response to receiving an input to power on a data processing system, a resource location code array table is accessed within a set of selected tables for the data processing system based on machine type. The selected set of tables is located in firmware within a service processor. An entry for a resource in the resource location code array table is read to determine whether the entry includes a no recollect tag. Then, in response to determining that the entry for the resource in the resource location code array table does include a no recollect tag, vital product data for the resource is not recollected during the initial program load.

11 Claims, 8 Drawing Sheets

PD
TABLE
400

Enclosure/Backplane VPD (implicit – FRU contains the SP)
402 — 1e00 :imp: — 408
P5IOC2 VPD – FSP DD1 addressing (implicit – same FRU as SP)
4300 :imp:
Ethernet Adapter Card VPD – DIO(80) sensing
   404
4200 :gpio:L,/dev/gpio/0/0/18/0,16:0: — 406
Anchor Card VPD – Smartchip 0 alert sensing
0500 :sced:L,/dev/uart/0/0/15/1,24:
Anchor Card VPD – Smartchip 1 alert sensing
0501 :sced:L,/dev/uart/0/0/15/1,25:
RAID adapter card #1 – DIO(81) sensing
3b00 :gpio:L,/dev/gpio/0/0/18/0,17:0:
RAID adapter card #2 – DIO(137) sensing
3b01 :gpio:L,/dev/gpio/0/0/20/0,9:0:
GX Card VPD #1 – DIO(122) sensing
0a00 :gpio:L,/dev/gpio/0/0/19/0,26:0:
GX Card VPD #2 – DIO(123) sensing
0a01 :gpio:L,/dev/gpio/0/0/19/0,27:0:
Processor 1 VPD (implicit – same FRU as SP)
1000 :imp:
...etc.

*FIG. 4*

VITAL PRODUCT DATA COLLECTION DURING PRE-STANDBY AND SYSTEM INITIAL PROGRAM LOAD

BACKGROUND OF THE INVENTION

1. Field of the Invention

The present invention relates generally to an improved data processing system and more specifically to a computer implemented method, system, and computer usable program code for improving vital product data recollection in a data processing system during an initial program load.

2. Description of the Related Art

Today, complex computer systems are made up of many different components, which must be identified to the operating system software stack running on those complex computer systems. In server systems, the firmware running on a service processor (SP) is responsible for collecting vital product data (VPD) from each of the resources or field replaceable units (FRUs) in the complex computer system, such as, for example, a central electronics complex (CEC). A CEC enclosure houses, for example, system processors, memory, an SP, disk drives, media bays, input/output (I/O) slots, and associated components. VPD collection by the SP for each of the FRUs provides the operating system software stack with a structured inventory of the CEC. The SP reads the VPD from the FRUs during a genesis boot of the SP. The VPD is cached within the SP when only portions of the computer system are powered on by the control supply. Completion of the SP boot results in a state called SP standby. In this standby state, the SP is functional, but the main processors, memory, and I/O controllers are not yet powered on.

Once a power on request is sent to the SP, the desire is to get the entire CEC powered on, initialized, code loaded, and running, which is known as an initial program load (IPL), as quickly as possible. Because some FRUs may be removed, replaced, or added to a CEC while the system is in the SP standby state, it is necessary for the SP firmware to verify that the VPD passed up to the operating system software stack is in fact the VPD that represents the resources installed in the CEC at the time the system was powered on.

BRIEF SUMMARY OF THE INVENTION

According to one embodiment of the present invention, selective recollection of vital product data during an initial program load at data processing system power on is provided. In response to receiving an input to power on a data processing system, a resource location code array table is accessed within a set of selected tables for the data processing system based on machine type. The selected set of tables is located in firmware within a service processor. An entry for a resource in the resource location code array table is read to determine whether the entry includes a no recollect tag. Then, in response to determining that the entry for the resource in the resource location code array table does include a no recollect tag, vital product data for the resource is not recollected during the initial program load.

BRIEF DESCRIPTION OF THE SEVERAL VIEWS OF THE DRAWINGS

FIG. 4 is an exemplary illustration of a PD table in accordance with an illustrative embodiment;

DETAILED DESCRIPTION OF THE INVENTION

Figure 1:
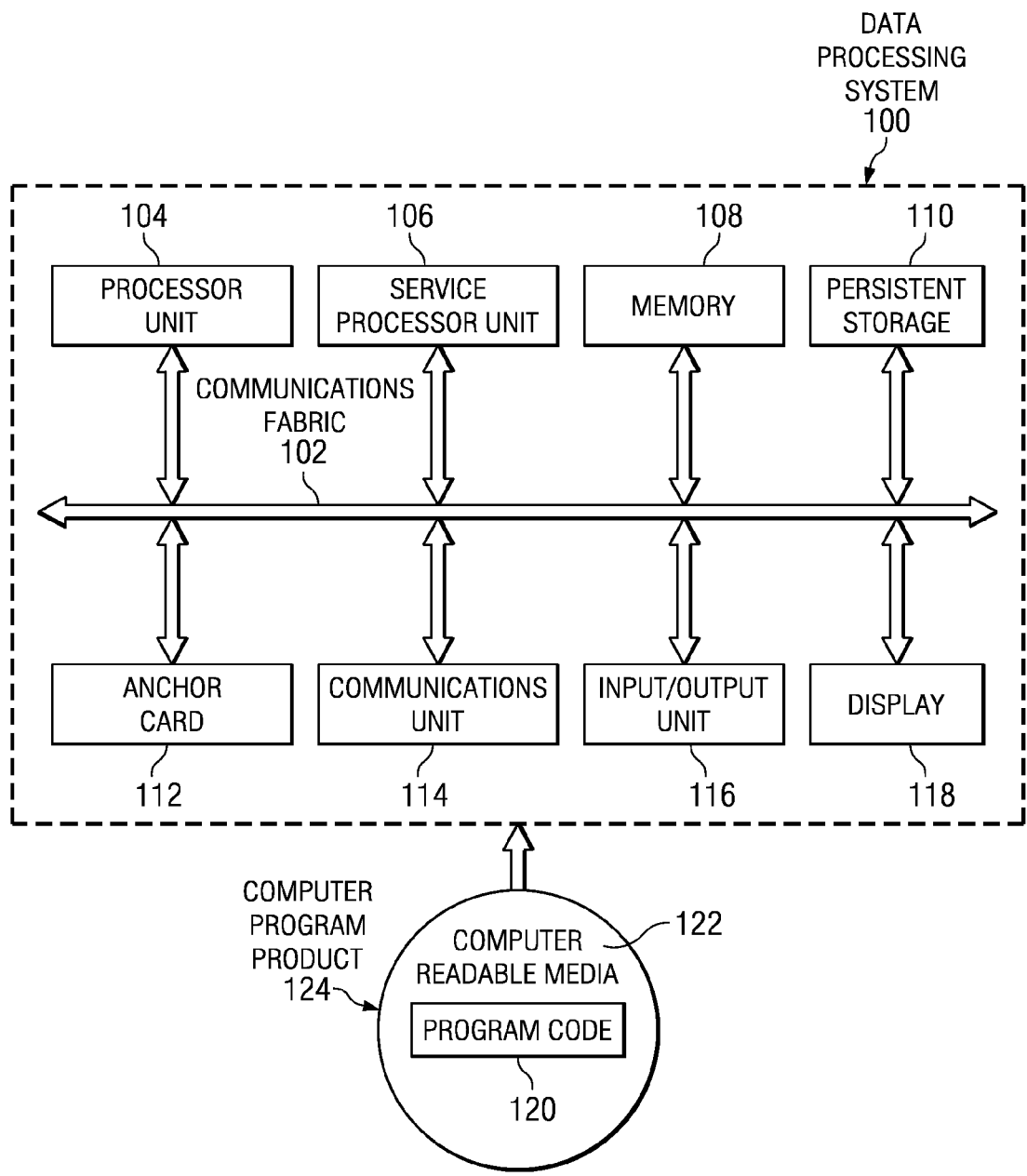
FIG. 1 is a diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
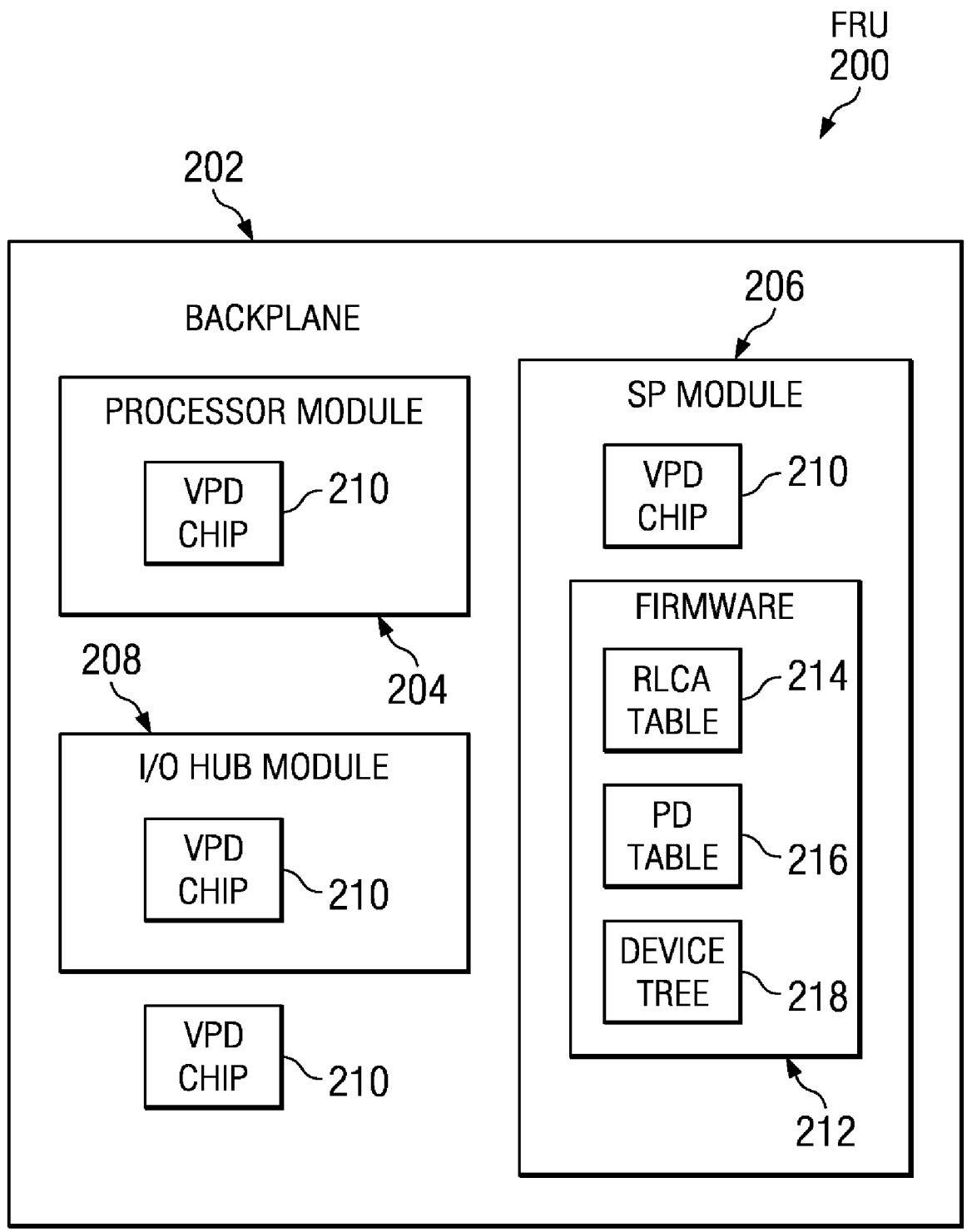
FIG. 2 is a block diagram of an FRU in accordance with an illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a diagram of a data processing system in which illustrative embodiments may be implemented. In this illustrative example, data processing system 100 includes communications fabric 102, which provides communications between processor unit 104, service processor (SP) unit 106, memory 108, persistent storage 110, anchor card 112, communications unit 114, input/output (I/O) unit 116, and display 118. Processor unit 104, SP unit 106, memory 108, persistent storage 110, anchor card 112, communications unit 114, input/output (I/O) unit 116, and display 118 are examples of FRUs.

FRUs may be circuit boards, parts, or assemblies that may be quickly and easily added to or removed from data processing system 100. Typically, FRUs include motherboards, central processing units (CPUs), random access memory (RAM) modules, system drives, such as floppy drives, hard disk drives, and optical drives, bus devices, such as video cards and sound cards, power supply units, cooling fans, and peripherals, such as keyboards, mice, printers, and the cables connecting them. A user or technician may add or remove certain of these FRUs while data processing system 100 is in a standby state.

Processor unit 104 serves to execute instructions for software that may be loaded into memory 108. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

SP unit 106 provides diagnostics, booting, initialization, configuration, and run time error detection and correction for data processing system 100. Memory 108 and persistent storage 110 are examples of storage devices. A storage device is any piece of hardware that is capable of storing information either on a temporary basis and/or a permanent basis. Memory 108, in these examples, may be, for example, a random access memory or any other suitable volatile or non-volatile storage device.

Persistent storage 110 may take various forms depending on the particular implementation. For example, persistent storage 110 may contain one or more components or devices. For example, persistent storage 110 may be a hard drive, a flash memory, a rewritable optical disk, a rewritable magnetic tape, or some combination of the above. The media used by persistent storage 110 also may be removable. For example, a removable hard drive may be used for persistent storage 110.

Anchor card 112 contains the VPD for data processing system 100. VPD is a collection of configuration and informational data about a system, device, or resource. Typically, VPD information may include system type, a product model number, a unique serial number, product release level, maintenance level, and other information specific to the device type. Also, VPD may include user-defined information, such as device location. Anchor card 112 may, for example, be located in the same position on all system types. Illustrative embodiments utilize anchor card 112 to determine the system type of data processing system 100.

Communications unit 114, in these examples, provides for communications with other data processing systems or devices. In these examples, communications unit 114 is a network interface card. Communications unit 114 may provide communications through the use of either or both physical and wireless communications links.

Input/output unit 116 allows for input and output of data with other devices that may be connected to data processing system 100. For example, input/output unit 116 may provide a connection for user input through a keyboard and mouse. Further, input/output unit 116 may send output to a printer. Display 118 provides a mechanism to display information to the user or technician.

Instructions for the operating system (OS) and applications or programs are located on persistent storage 110. These instructions may be loaded into memory 108 for execution by processor unit 104. The processes of the different embodiments may be performed by processor unit 104 using computer implemented instructions, which may be located in a memory, such as memory 108. These instructions are referred to as program code, computer usable program code, or computer readable program code that may be read and executed by a processor in processor unit 104. The program code in the different embodiments may be embodied on different physical or tangible computer readable media, such as memory 108 or persistent storage 110.

Program code 120 is located in a functional form on computer readable media 122 that is selectively removable and may be loaded onto or transferred to data processing system 100 for execution by processor unit 104. Program code 120 and computer readable media 122 form computer program product 124 in these examples. In one example, computer readable media 122 may be in a tangible form, such as, for example, an optical or magnetic disc that is inserted or placed into a drive or other device that is part of persistent storage 110 for transfer onto a storage device, such as a hard drive that is part of persistent storage 110. In a tangible form, computer readable media 122 also may take the form of a persistent storage, such as a hard drive, a thumb drive, or a flash memory that is connected to data processing system 100. The tangible form of computer readable media 122 is also referred to as computer recordable storage media. In some instances, computer readable media 122 may not be removable.

Alternatively, program code 120 may be transferred to data processing system 100 from computer readable media 122 through a communications link to communications unit 114 and/or through a connection to input/output unit 116. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 may be varied from the illustrative examples shown.

As one example, a storage device in data processing system 100 is any hardware apparatus that may store data. Memory 108, persistent storage 110 and computer readable media 122 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 108 or a cache such as found in an interface and memory controller hub that may be present in communications fabric 102.

Illustrative embodiments provide a computer implemented method, system, and computer usable program code for selectively recollecting VPD during an IPL at data processing system power on. In response to receiving an input to power on a data processing system, an SP accesses a resource location code array table within a set of selected tables for the data processing system based on machine type. The selected set of tables is located in firmware within the SP. The SP reads an entry for a resource in the resource location code array table to determine whether the entry includes a no recollect tag. Then, in response to determining that the entry for the resource in the resource location code array table does include a no recollect tag, the SP does not recollect the VPD for the resource during the IPL. Thus, illustrative embodiments limit the number of resources or FRUs, which the SP processes, to those resources that could possibly have been added or replaced at system standby.

With reference now to FIG. 2, a block diagram of an FRU is depicted in accordance with an illustrative embodiments. FRU 200 is an example of a resource that may be plugged into or unplugged from a data processing system, such as data processing system 100 in FIG. 1. FRU 200 includes backplane 202, processor module 204, SP module 206, and input/output (I/O) hub module 208. In other words, FRU 200 is an example of an FRU that is comprised of a plurality of resources.

In addition, backplane 202, processor module 204, SP module 206, and I/O hub module 208 each include a VPD chip. VPD chip 210 is a microchip that contains VPD for whatever resource VPD chip 210 is attached to. In other words, one instance of VPD chip 210 contains VPD for backplane 202, another instance of VPD chip 210 contains VPD for processor module 204, another instance of VPD chip 210 contains VPD for SP module 206, and another instance of VPD chip 210 contains VPD for I/O hub module 208. However, it should be noted that in this illustrative example VPD chip 210 represents a plurality of VPD chips and not just the same VPD chip. Also, it should be noted that not all resources in a data processing system include a VPD chip.

Backplane 202 is a circuit board, such as a printed circuit board. Backplane 202 electrically connects processor module 204, SP module 206, and I/O hub module 208. Also backplane 202 electronics connects to other devices or circuit boards, such as I/O adapter cards and disk drives. Typically, backplanes are found in servers, disk enclosures, and disk arrays.

Processor module 204 represents one or more main processing units. Processor module 204 may, for example, be processing unit 104 in FIG. 1. SP module 206 provides diagnostics, booting, initialization, configuration, and run time error detection and correction for the data processing system. SP module 206 may, for example, be SP unit 106 in FIG. 1. SP module 206 includes firmware 212. Firmware 212 is microcode that is embedded in SP module 206. The microcode may, for example, perform collection of VPD from resources in the data processing system during a genesis boot of SP module 206 or recollection of the VPD during IPL at system power on.

Illustrative embodiments use a set of tables in firmware 212, which define all possible resources or FRUs that may be present in the data processing system. Firmware 212 selects the set of tables based on the machine type. The set of tables includes resource location code array (RLCA) table 214 and presence detect (PD) table 216. However, it should be noted that illustrative embodiments may also include other tables, such as a hardware VPD address table (HVAT), within the set of tables.

RLCA table 214 is a hierarchical representation that defines parent/child relationships of all possible resources within the system. RLCA table 214 includes one entry for each possible resource that may be found in the data processing system. In addition, within each entry in RLCA table 214 is an indication as to whether a possible resource includes a VPD chip.

PD table 216 contains information on how to determine if a resource (i.e., an FRU) is present in the data processing system. PD table 216 includes one entry for each resource with an associated VPD chip. During VPD collection and recollection, SP module 206 uses PD table 216 to determine if a resource is present in the system. If and only if the resource is present in the system, will SP module 206 read VPD chip 210 on that particular resource.

To improve performance of VPD collection and VPD recollection, illustrative embodiments add special tags to the RLCA and PD tables. In RLCA table 214, a no recollect (:nr:) tag is added to resource entries when it is not physically possible to remove or add the FRU at SP module 206 standby or can be dynamically detected when changed. In PD table 216, an implicit (:imp:) tag is added to resource entries when it is implicit that the resource is present if the SP is running code. In other words, this :imp: tag occurs on resource entries where the resource is included on the same FRU as SP module 206.

Device tree 218 also is a hierarchical representation that shows parent/child relationships of all the resources or FRUs actually present in the data processing system. SP module 206 creates device tree 218 while collecting initial resource VPD during a genesis boot of SP module 206. SP module 206 then caches device tree 218 in firmware 212. Subsequently, SP module 206 updates device tree 218 while recollecting resource VPD during IPL. Afterward, SP module 206 presents updated device tree 218 to an OS software stack that is executing on processor module 204.

SP module 206 begins VPD collection by using RLCA 214 and PD table 216, which are selected based on the machine type. SP module 206 may achieve a standby state only after all VPD collection is completed. After reaching this standby state, SP module 206 has created device tree 218 that represents all resources actually present in the system. Further, while in this SP module 206 standby state the main power has not yet been applied to the system. As a result, many of the system resources may be safely removed or added to the system while at SP module 206 standby. From the SP module 206 standby state the system may be powered on and the IPL performed.

SP module 206 performs VPD recollection when the user or technician of the system initiates a power on of the system. Since resources may have been added or removed while the system was at SP module 206 standby, it is possible that device tree 218, which was created during the initial VPD collection process, is no longer a true representation of the system resource configuration. Thus, VPD recollection is necessary.

If a resource entry in the RLCA table is marked with an :nr: tag, then SP module 206 does not perform VPD recollection for that resource. In addition, if a resource entry in the PD table is marked with an :imp: tag, then SP module 206 knows that the resource is on the same FRU as SP module 206. As a result, SP module 206 does not need to determine whether the resource is present in the data processing system. Thus, the only entries in the RLCA table, which need further VPD processing, are those entries for resources that may have been plugged into or unplugged from the system at SP module 206 standby. By the end of the VPD recollection process, device tree 218 is updated to reflect the current resource configuration of the data processing system. This updated device tree 218 is then presented to the OS running on processor 204.

Figure 3:
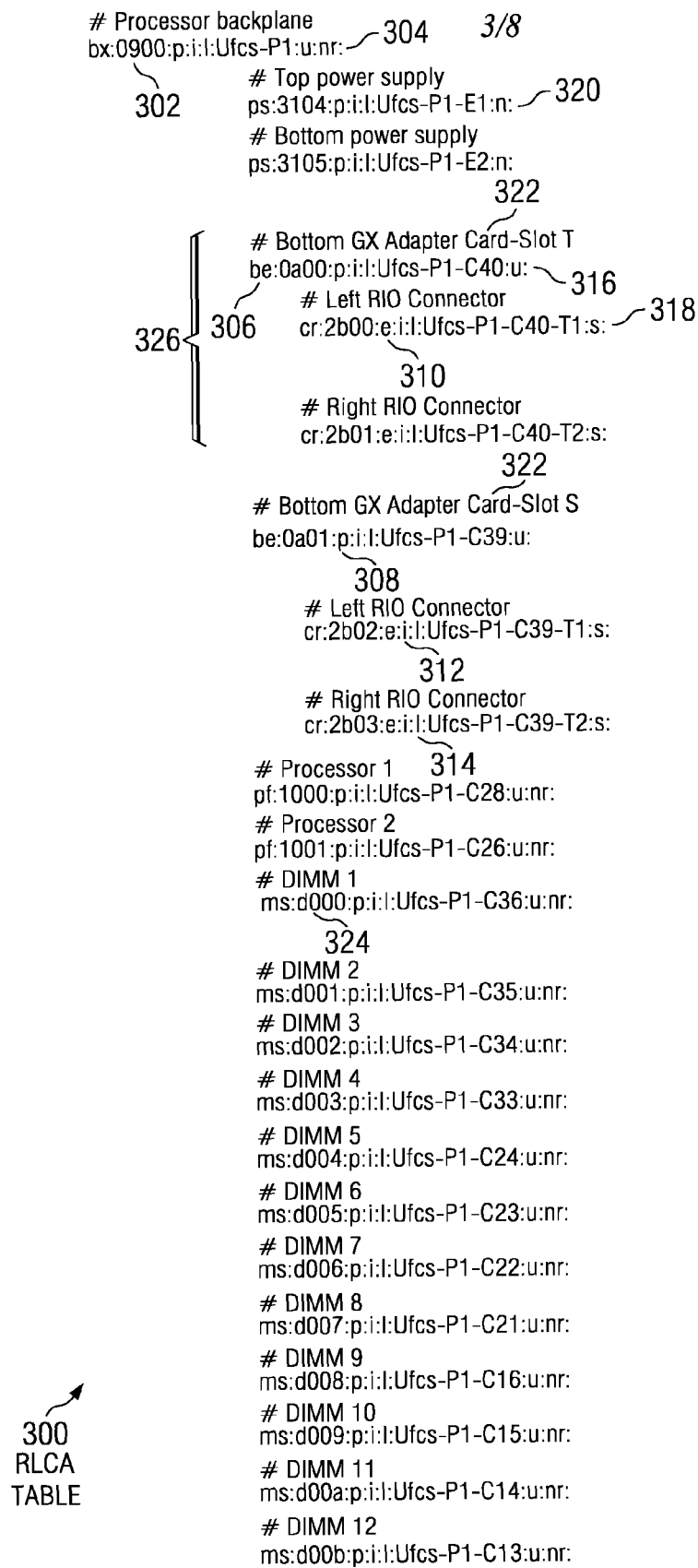
FIG. 3 is an exemplary illustration of an RLCA table in accordance with an illustrative embodiment.

With reference now to FIG. 3, an exemplary illustration of an RLCA table is depicted in accordance with an illustrative embodiment. RLCA table 300 may, for example, be RLCA table 214 in FIG. 2. RLCA table 300 defines all the possible resources that may be in a data processing system, such as a CEC. In addition, RLCA table 300 assigns a unique resource ID (RID) number, such as RID number 302, to each resource entry. An FRU, such as FRU 200 in FIG. 2, may include one or more resources. In the case where an FRU only includes a single resource and the resource has no embedded child resources, a one-to-one relationship exists between RID number 324 for the resource and an FRU VPD. In the case where an FRU includes multiple embedded resources, such as I/O adapter card 326 that includes embedded connector resources 310, one RID number exists for each of these resources, but these multiple RID numbers are associated with only a single FRU VPD, such as a single part number (PN) and serial number (SN). This type of multiple resource FRU includes one or more VPD chips. However, if more than one VPD chip exists on the FRU, then all the VPD chips will contain the same FRU PN and SN values.

A no recollect tag, such as :nr: tag 304, is added to entries to mark those RID numbers that have associated VPD chips where the FRU on which that resource resides cannot possibly be removed or added while the system is at SP standby or a remove/add action is dynamically detected. The VPD recollection process may use :nr: tag 304 to identify entries where no reads to the resource VPD need to be performed, no compares with the cached VPD need to be performed, and no updates to the cached VPD need to be performed. Thus, improved performance of the VPD recollection process is achieved by saving time.

RLCA table 300 shows the parent/child structure of the resources within the system. This parent/child relationship is shown by the use of indentation in RLCA table 300. Each resource entry includes RID number 302, a two-character resource type, such as resource type 306, an indication of whether this resource is a physical FRU, which is indicated by a :p: tag, such as :p: tag 308, or whether the resource is embedded on a parent FRU, which is indicated by an :e: tag, such as :e: tag 310. An :i: tag, such as :i: tag 312, in an entry indicates that the entry is to be passed up to the OS software stack. An :I: tag, such as :I: tag 314, in an entry defines the location code for a resource. A :u: tag, such as :u: tag 316, in an entry indicates that a unique VPD chip is associated with the resource. An :s: tag, such as :s: tag 318, in an entry indicates that the resource uses the same VPD chip as its parent. An :n: tag, such as :n: tag 320, in an entry indicates that the resource does not have a VPD chip that can be read by the SP.

Illustrative embodiments use :nr: tag 304 on :u: tagged resource entries where it is appropriate. For example, only GX Adapter Card 322 can be replaced at SP standby in this example. All other RLCA table 300 resource entries, which have a unique VPD chip associated with them, are marked with :nr: tag 304. The use of :nr: tag 304 results in a significant savings in the time needed for VPD recollection because illustrative embodiments avoid any access of the VPD chip for each resource entry with :nr: tag 304. The use of :nr: tag 304 in RCLA table 300 results in fifteen less accesses to VPD chips during a VPD recollection process. Consequently, on very large system configurations illustrative embodiments may produce a significant reduction in IPL time. Also, on smaller system configurations, such as blade servers, where all resource entries are tagged with an :nr: tag, illustrative embodiments essentially reduce VPD recollection to a no operation (no-op) during system IPL.

With reference now to FIG. 4, an exemplary illustration of a PD table is depicted in accordance with an illustrative embodiment. PD table 400 may, for example, be PD table 216 in FIG. 2. PD table 400 contains an entry for each RID number that has a VPD chip associated with it. RID numbers provide a cross reference from entries in an RLCA table, such as entries in RLCA table 300 in FIG. 3, to entries in PD table 400. Each table entry shows the RID number of the resource, such as RID number 402, an indication of what mechanism is used to do presence detection for this RID number, such as presence detection mechanism 404, and the detailed information needed to access the resource that may indicate whether the FRU is present in the system, such as detailed information 406.

Firmware, such as firmware 212 in FIG. 2, provides a presence detection function, which is called with an RID number as input. This presence detection function will return one of two results. One result is that the resource is present in system. The other result is that the resource is not present in system.

Not having to access the presence detect hardware for RID numbers associated with resources that are on the same physical FRU as the SP resource, such as, for example, processor module 204 and I/O hub module 208 are on the same physical FRU 200 as SP module 206 in FIG. 2, saves access time needed to get to these resources. Access time is saved because presence of these resources is assumed. Presence is assumed because these resources are packaged with the SP module.

PD table 400 shows the use of an :imp: tag, such as :imp: tag 408, for a system where the SP module is on the same backplane, such as backplane 202 in FIG. 2, as the processor module and the I/O hub module. The :imp: tag may also be used as an indicator that the SP module has been moved from one system to another and that the SP module cache needs to be refreshed via a genesis IPL. For example, any time an :imp: tagged FRU is found to be installed in a new system, illustrative embodiments know the SP module has been moved between systems. Data held in the firmware cache for the prior system needs to be cleared and a genisis IPL is required to initialize firmware caching. Also, any time an :imp: tagged FRU is found not to have the VPD for that FRU cached in the SP firmware, illustrative embodiments know that the SP module FRU is new or has been moved.

In addition, the :imp: tag may be used to save resource time for more than implicit presence detection of resources. For example, when a system is coming up to standby, the system must verify its cached VPD against that stored in a selected set of tables based on machine type. Because the cache memory is contained on the SP FRU, :imp: tagged RID numbers do not need to be verified during the VPD recollection process because the resources are on the same FRU as the SP. In other words, an :imp: tagged RID number, which represents a resource packaged on the same FRU as the SP, cannot be changed out without changing out the cached VPD. As a result, resource access time is saved for PN and SN checks done in the verification process during VPD recollection.

Figure 5:
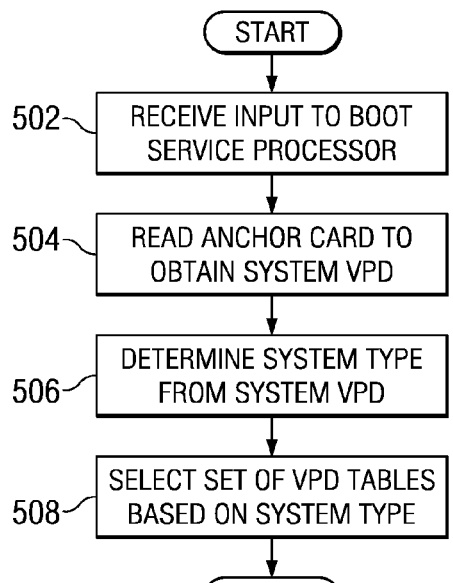
FIG. 5 is a flowchart illustrating an exemplary process for collecting system VPD in accordance with an illustrative embodiment.

With reference now to FIG. 5, a flowchart illustrating an exemplary process for collecting system VPD is shown in accordance with an illustrative embodiment. The process shown in FIG. 5 may be implemented in a SP, such as SP module 206 in FIG. 2.

The process begins when the SP receives an input to boot (step 502). Then, the SP reads an anchor card, such as anchor card 112 in FIG. 1, to obtain system VPD, such as the system type, model number, and serial number, of a data processing system, such as data processing system 100 in FIG. 1 (step 504). Afterward, the SP determines the system type of the data processing system from the system VPD (step 506). Subsequently, the SP selects a set of VPD tables, such as RLCA table 214 and PD table 216 in FIG. 2, based on the determined system type of the data processing system (step 508). The process completes thereafter.

Figure 6A:
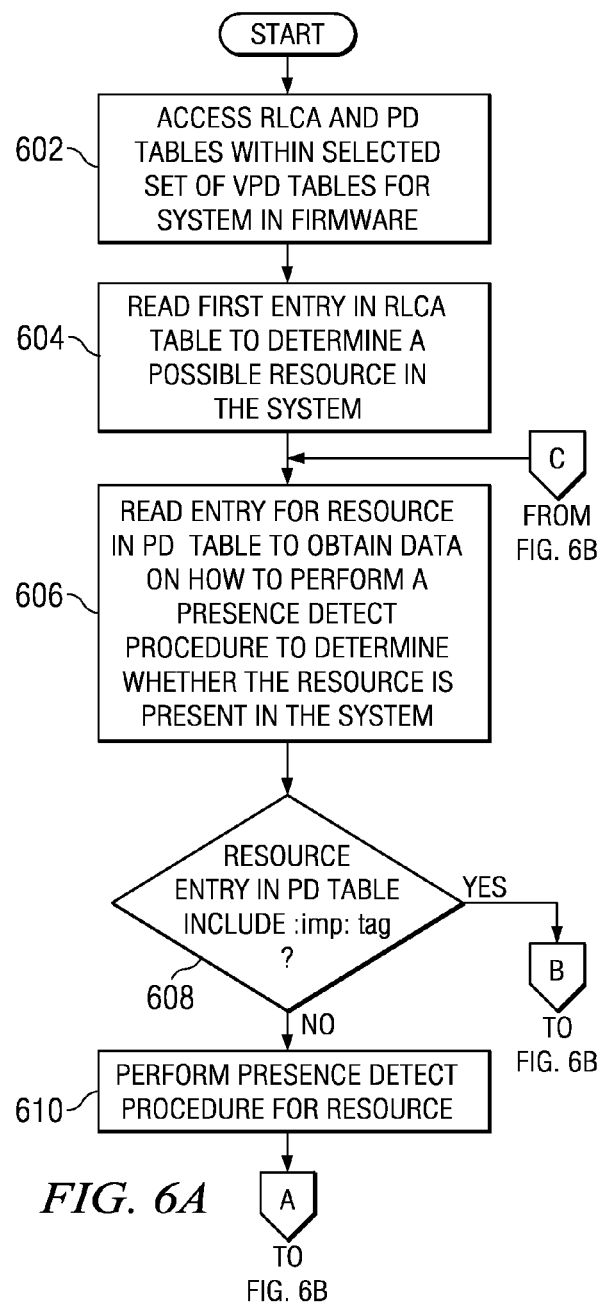
FIG. 6A and FIG. 6B is a flowchart illustrating an exemplary process for collecting FRU VPD in accordance with an illustrative embodiment; and FIG. 7A
Figure 6B:
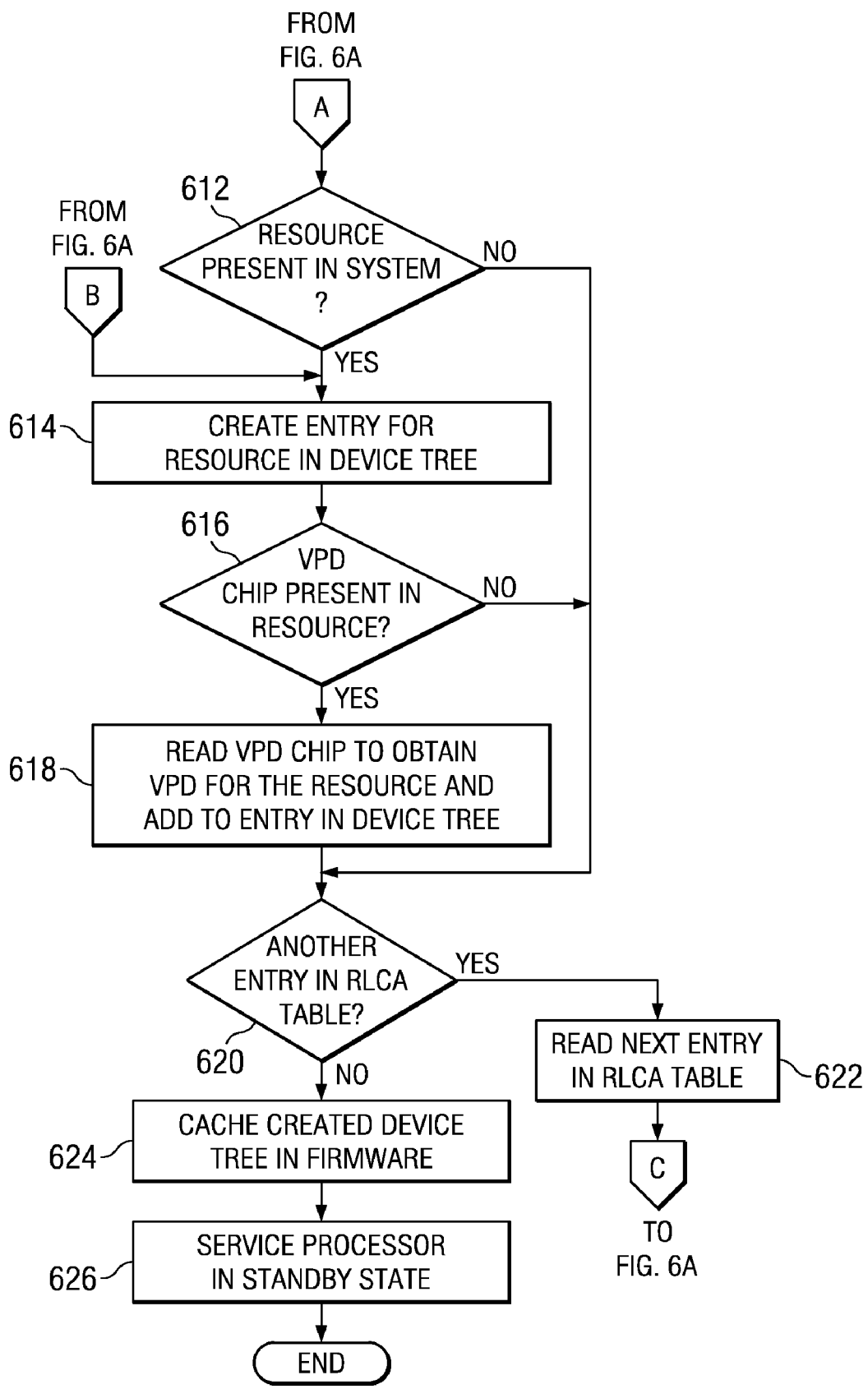

With reference now to FIG. 6A and FIG. 6B, a flowchart illustrating an exemplary process for collecting FRU VPD is shown in accordance with an illustrative embodiment. The process shown in FIGS. 6A and 6B may be implemented in a SP, such as SP module 206 in FIG. 2.

The process begins when the SP accesses an RLCA table and a PD table in firmware, such as RLCA table 214 and PD table 216 in firmware 212 in FIG. 2, which the SP selected from a set of tables in step 508 in FIG. 5 for the data processing system based on machine type (step 602). Then, the SP reads the first entry in the RLCA table to determine a possible resource in the data processing system (step 604). Then, the SP reads an entry in the PD table to obtain data on how to perform a presence detect procedure to determine whether the resource is present in the data processing system (step 606).

After reading the entry in the PD table in step 606, the SP makes a determination as to whether the resource entry in the PD table includes an :imp: tag (step 608). If the resource entry in the PD table does include an :imp: tag, yes output of step 608, then the process proceeds to step 614. If the resource entry in the PD table does not include an :imp: tag, no output of step 608, then the SP performs the presence detect procedure for the resource (step 610).

Subsequently, the SP makes a determination as to whether the resource is present in the data processing system (step 612). If the resource is not present in the data processing system, no output of step 612, then the process proceeds to step 620. If the resource is present in the data processing system, yes output of step 612, then the SP creates an entry for the resource in a device tree, such as device tree 218 in FIG. 2 (step 614).

Then, the SP makes a determination as to whether a VPD chip, such as VPD chip 210 in FIG. 2, is present in the resource (step 616). If a VPD chip is not present in the resource, no output of step 616, then the process proceeds to step 620. If a VPD chip is present in the resource, yes output of step 616, then the SP reads the VPD chip to obtain VPD for the resource and adds the VPD for the resource to the entry in the device tree (step 618).

Then, the SP makes a determination as to whether another entry in the RLCA table exists (step 620). If another entry in the RLCA table does exist, yes output of step 620, then the SP reads the next entry in the RLCA table (step 622). Thereafter, the process returns to step 606. If another entry in the RLCA table does not exist, no output of step 620, then the SP caches the created device tree in the firmware (step 624). Subsequently, the SP enters a standby state (step 626). The process completes thereafter.

Figure 7A:
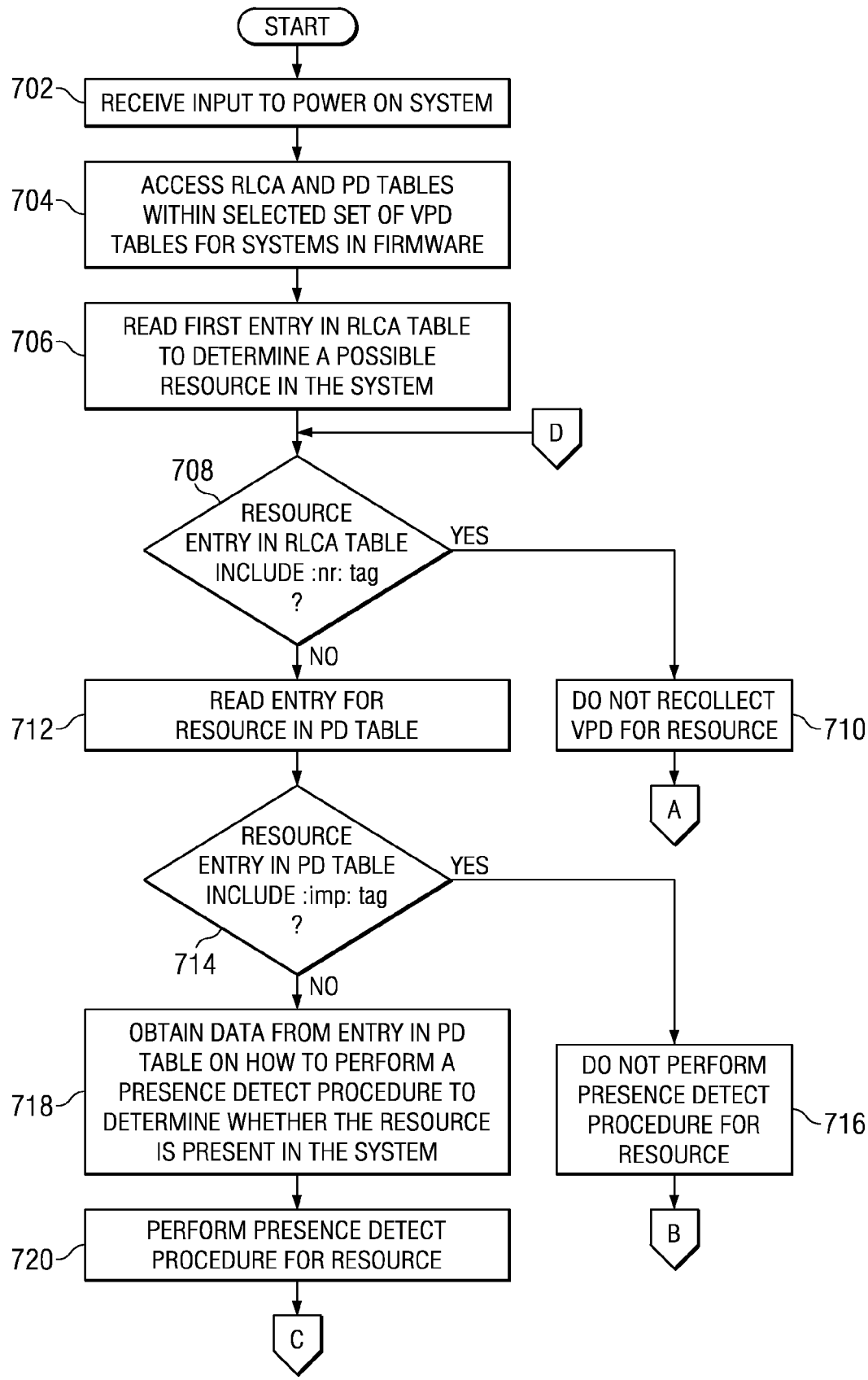
FIG. 7B is a flowchart illustrating an exemplary process for recollecting FRU VPD in accordance with an illustrative embodiment.
Figure 7B:
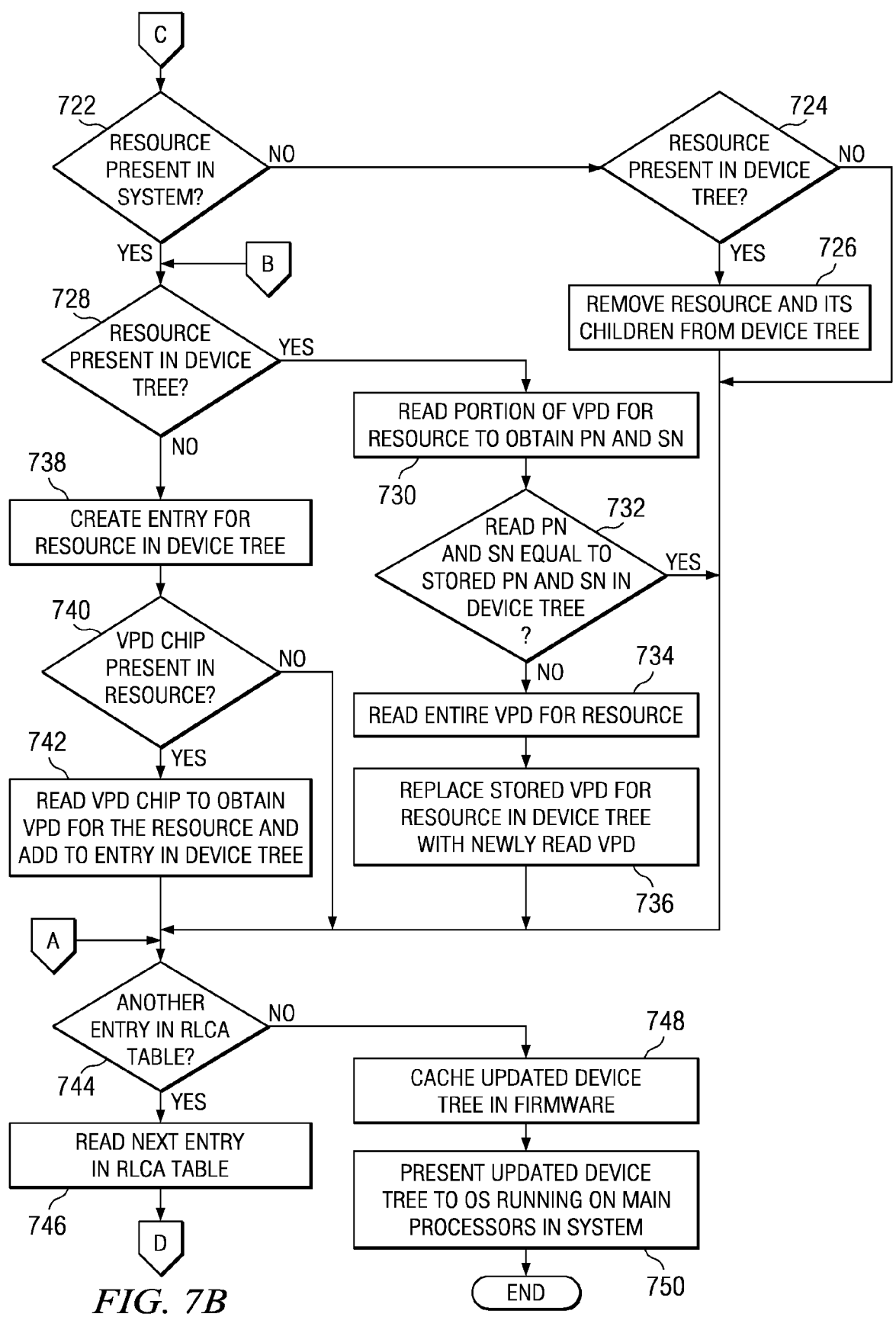

With reference now to FIG. 7A and FIG. 7B, a flowchart illustrating an exemplary process for recollecting FRU VPD is shown in accordance with an illustrative embodiment. The process shown in FIGS. 7A and 7B may be implemented in a SP, such as SP module 206 in FIG. 2.

The process begins when a data processing system, such as data processing system 100 in FIG. 1, receives an input to power on (step 702). After receiving the input to power on in step 702, the data processing system uses the SP to access an RLCA table and a PD table in firmware, such as RLCA table 214 and PD table 216 in firmware 212 in FIG. 2, which the SP selected from a set of tables in step 508 in FIG. 5 for the data processing system based on machine type (step 704). Then, the SP reads the first entry in the RLCA table to determine a possible resource in the data processing system (step 706).

Subsequent to reading the first entry in the RLCA table in step 706, the SP makes a determination as to whether the resource entry includes an :nr: tag (step 708). If the resource entry does include an :nr: tag, yes output of step 708, then the SP does not recollect the VPD for the resource because it is not physically possible to remove or add the resource at SP standby or a remove/add action is dynamically detected (step 710). Thereafter, the process proceeds to step 744. If the resource entry does not include an :nr: tag, no output of step 708, then the SP reads the entry for the resource in the PD table (step 712).

After reading the entry for the resource in the PD table in step 712, the SP makes a determination as to whether the resource entry includes an :imp: tag (step 714). If the resource entry does include an :imp: tag, yes output of step 714, then the SP does not perform a presence detect procedure for the resource because it is implicit that the resource is present in the data processing system (step 716). The resource is implicitly present in the system because the resource is packaged on the same FRU as the SP. Thereafter, the process proceeds to step 728. If the resource entry does not include an :imp: tag, no output of step 714, then the SP obtains data from the resource entry on how to perform the presence detect procedure to determine whether the resource is present in the data processing system (step 718).

Then, the SP performs the presence detect procedure for the resource (step 720). After performing the presence detect procedure in step 720, the SP makes a determination as to whether the resource is present in the data processing system (step 722). If the resource is not present in the data processing system, no output of step 722, then the SP makes a determination as to whether the resource is present in the device tree (step 724). If the resource is present in the device tree, yes output of step 724, then the SP removes all entries for the resource and its children from the device tree (step 726). Thereafter, the process proceeds to step 744. If the resource is not present in the device tree, no output of step 724, then the process proceeds to step 744.

Returning again to step 722, if the resource is present in the data processing system, yes output of step 722, then the SP makes a determination as to whether the resource is present in the device tree (step 728). If the resource is present in the device tree, yes output of step 728, then the SP reads a portion of the resource VPD to obtain a PN and a SN for the resource (step 730). Subsequent to reading the resource VPD to obtain the PN and SN for the resource in step 730, the SP makes a determination as to whether the read PN and SN are equal to, or the same as, the stored PN and SN in the device tree (step 732).

If the read PN and SN are equal to the stored PN and SN in the device tree, yes output of step 732, then the process proceeds to step 744. If the read PN and SN are not equal to the stored PN and SN in the device tree, no output of step 732, then the SP reads the entire VPD for the resource (step 734). Then, the SP replaces the stored VPD for the resource in the device tree with the newly read VPD (step 736). Thereafter, the process proceeds to step 744.

Returning again to step 728, if the resource is not present in the device tree, no output of step 728, then the SP creates an entry for the resource in the device tree (step 738). Then, the SP makes a determination as to whether a VPD chip is present in the resource (step 740). If a VPD chip is not present in the resource, no output of step 740, then the process proceeds to step 744. If a VPD chip is present in the resource, yes output of step 740, then the SP reads the VPD chip to obtain the VPD for the resource and adds the VPD for the resource to the entry in the device tree (step 742).

Then, the SP makes a determination as to whether another entry in the RLCA table exists (step 744). If another entry in the RLCA table does exist, yes output of step 744, then the SP reads the next entry in the RLCA table (step 746). Thereafter, the process returns to step 708 where the SP makes a determination as to whether the resource entry in the RLCA table includes an :nr: tag. If another entry in the RLCA table does not exist, no output of step 744, then the SP caches the updated device tree in the firmware (step 748). Afterward, the SP presents the updated device tree to an OS running on one or more main processors, such as processor unit 104 in FIG. 1, in the data processing system (step 750). The process completes thereafter.

Thus, illustrative embodiments provide a computer implemented method, system, and computer program product for selectively recollecting VPD during an IPL at data processing system power on or during VPD pre-standby collection. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selectively recollecting vital product data during an initial program load at data processing system power on, the computer implemented method comprising:
   responsive to receiving an input to power on a data processing system, reading an anchor card located in the data processing system that includes a machine type of the data processing system;
   selecting a set of tables located within firmware of a service processor of the data processing system based on the machine type of the data processing system read from the anchor card;
   accessing a resource location code array table within the selected set of tables for the data processing system that is a hierarchical representation of parent/child relationships of all resources that could be present in the data processing system and indicates which of the resources include an associated vital product data microchip, wherein a no recollect vital product data tag is added to entries of resources having associated vital product data microchips in the resource location code array table that indicates the resources cannot be removed from or added to the data processing system while the service processor is in a standby state, and wherein the associated vital product data microchips contain vital product data of the resources attached to a respective vital product data microchip;
   reading an entry for a resource in the resource location code array table to determine whether the entry for the resource includes the no recollect vital product data tag indicating that the resource cannot be removed from or added to the data processing system while the service processor is in the standby state;
   responsive to determining that the entry for the resource in the resource location code array table does include the no recollect vital product data tag, not recollecting vital product data from a vital product data microchip located on the resource during the initial program load; and
   responsive to determining that the entry for the resource in the resource location code array table does not include the no recollect vital product data tag, reading an entry for the resource in a presence detect table within the selected set of tables for the data processing system to determine whether the entry for the resource includes an implicit tag that indicates the resource is implicit within the data processing system because the resource is included on a same field replaceable unit as the service processor and not performing a presence detect procedure for the resource in response to determining that the entry for the resource does include the implicit tag because the resource is included on the same field replaceable unit as the service processor, wherein the presence detect table contains entries for each resource that includes an associated vital product data microchip.

2. The computer implemented method of claim 1, further comprising:
   responsive to determining that the entry for the resource in the presence detect table does not include an implicit tag, obtaining data from the entry on how to perform a presence detect procedure for the resource; and
   performing the presence detect procedure to determine whether the resource is present in the data processing system.

3. The computer implemented method of claim 2, further comprising:
   responsive to determining that the resource is not present in the data processing system and that an entry for the resource is present in a device tree that was created during a boot of the service processor, removing the entry for the resource from the device tree.

4. The computer implemented method of claim 2, further comprising:
   responsive to determining that the resource is present in the data processing system and that an entry for the resource is not present in a device tree that was created during a boot of the service processor, creating an entry for the resource in the device tree.

5. The computer implemented method of claim 3, wherein the device tree is a hierarchical representation of parent/child relationships of all resources that are present in the data processing system.

6. A data processing system for selectively recollecting vital product data during an initial program load at data processing system power on, comprising:
   a bus system;
   a storage device connected to the bus system, wherein the storage device stores a set of instructions; and
   a processing unit connected to the bus system, wherein the processing unit executes the set of instructions to read an anchor card located in the data processing system that includes a machine type of the data processing system in response to receiving an input to power on the data processing system; select a set of tables located within firmware of a service processor of the data processing system based on the machine type of the data processing system read from the anchor card; access a resource location code array table within the selected set of tables for the data processing system that is a hierarchical representation of parent/child relationships of all resources that could be present in the data processing system and indicates which of the resources include an associated vital product data microchip, wherein a no recollect vital product data tag is added to entries of resources having associated vital product data microchips in the resource location code array table that indicates the resources cannot be removed from or added to the data processing system while the service processor is in a standby state, and wherein the associated vital product data microchips contain vital product data of the resources attached to a respective vital product data microchip; read an entry for a resource in the resource location code array table to determine whether the entry for the resource includes the no recollect vital product data tag indicating that the resource cannot be removed from or added to the data processing system while the service processor is in the standby state; not recollect vital product data from a vital product data microchip located on the resource during the initial program load in response to determining that the entry for the resource in the resource location code array table does include the no recollect vital product data tag; and read an entry for the resource in a presence detect table within the selected set of tables for the data processing system to determine whether the entry for the resource includes an implicit tag that indicates the resource is implicit within the data processing system because the resource is included on a same field replaceable unit as the service processor in response to determining that the entry for the resource in the resource location code array table does not include the no recollect vital product data tag and not performing a presence detect procedure for the resource in response to determining that the entry for the resource does include the implicit tag because the resource is included on the same field replaceable unit as the service processor, wherein the presence detect table contains entries for each resource that includes an associated vital product data microchip.

7. A computer program product stored in a computer readable storage device having computer usable program code embodied therein that is executable by a computer for selectively recollecting vital product data during an initial program load at data processing system power on, the computer program product comprising:
    computer usable program code for reading an anchor card located in a data processing system that includes a machine type of the data processing system in response to receiving an input to power on the data processing system;
    computer usable program code for selecting a set of tables located within firmware of a service processor of the data processing system based on the machine type of the data processing system read from the anchor card;
    computer usable program code for accessing a resource location code array table within the selected set of tables for the data processing system that is a hierarchical representation of parent/child relationships of all resources that could be present in the data processing system and indicates which of the resources include an associated vital product data microchip, wherein a no recollect vital product data tag is added to entries of resources having associated vital product data microchips in the resource location code array table that indicates the resources cannot be removed from or added to the data processing system while the service processor is in a standby state, and wherein the associated vital product data microchips contain vital product data of the resources attached to a respective vital product data microchip;
    computer usable program code for reading an entry for a resource in the resource location code array table to determine whether the entry for the resource includes the no recollect vital product data tag indicating that the resource cannot be removed from or added to the data processing system while the service processor is in the standby state;
    computer usable program code for not recollecting vital product data from a vital product data microchip located on the resource during the initial program load in response to determining that the entry for the resource in the resource location code array table does include the no recollect vital product data tag; and
    computer usable program code for reading an entry for the resource in a presence detect table within the selected set of tables for the data processing system to determine whether the entry for the resource includes an implicit tag that indicates the resource is implicit within the data processing system because the resource is included on a same field replaceable unit as the service processor in response to determining that the entry for the resource in the resource location code array table does not include the no recollect vital product data tag and not performing a presence detect procedure for the resource in response to determining that the entry for the resource does include the implicit tag because the resource is included on the same field replaceable unit as the service processor, wherein the presence detect table contains entries for each resource that includes an associated vital product data microchip.

8. The computer program product of claim 7, further comprising:
    computer usable program code for obtaining data from the entry for the resource in the presence detect table on how to perform a presence detect procedure for the resource in response to determining that the entry does not include an implicit tag; and
    computer usable program code for performing the presence detect procedure to determine whether the resource is present in the data processing system.

9. The computer program product of claim 8, further comprising:
    computer usable program code for removing an entry for the resource from a device tree in response to determining that the resource is not present in the data processing system and that the entry for the resource is present in the device tree that was created during a boot of the service processor.

10. The computer program product of claim 8, further comprising:
    computer usable program code for creating an entry for the resource in a device tree in response to determining that the resource is present in the data processing system and that the entry for the resource is not present in the device tree that was created during a boot of the service processor.

11. The computer program product of claim 9, wherein the device tree is a hierarchical representation of parent/child relationships of all resources that are present in the data processing system.

* * * * *